United States Patent
Amilien et al.

(10) Patent No.: US 8,596,419 B2
(45) Date of Patent: Dec. 3, 2013

(54) DIVIDER DEVICE FOR FLOW OF LUBRICANT AND LUBRICATION SYSTEM

(75) Inventors: Guillaume Amilien, Vivy (FR); Régis Page, Bagneux (FR)

(73) Assignee: Aktiebolaget SKF, Göteborg (SE)

( * ) Notice: Subject to any disclaimer, the term of this patent is extended or adjusted under 35 U.S.C. 154(b) by 213 days.

(21) Appl. No.: 13/123,326

(22) PCT Filed: Oct. 6, 2009

(86) PCT No.: PCT/EP2009/062949
§ 371 (c)(1),
(2), (4) Date: Jun. 27, 2011

(87) PCT Pub. No.: WO2010/040733
PCT Pub. Date: Apr. 15, 2010

(65) Prior Publication Data
US 2011/0259671 A1 Oct. 27, 2011

(30) Foreign Application Priority Data
Oct. 8, 2008 (FR) ..................................... 08 56823

(51) Int. Cl.
- *F01M 1/00* (2006.01)
- *B23Q 11/12* (2006.01)
- *F16L 41/00* (2006.01)
- *B05B 1/26* (2006.01)

(52) U.S. Cl.
USPC ....... 184/6.26; 184/6.8; 184/6.14; 137/561 A; 239/499

(58) Field of Classification Search
USPC .......... 184/6.14, 6.8, 6.26, 7.1; 239/464, 490, 239/491, 548; 137/561 A; 384/474
See application file for complete search history.

(56) References Cited

U.S. PATENT DOCUMENTS

| | | | | |
|---|---|---|---|---|
| 2,857,961 A | * | 10/1958 | Brown, III et al. | 431/116 |
| 3,361,183 A | * | 1/1968 | Reichhelm | 431/116 |
| 3,563,055 A | * | 2/1971 | Owens | 62/525 |
| 3,705,784 A | * | 12/1972 | Reichhelm et al. | 431/116 |
| 4,130,388 A | * | 12/1978 | Flanagan | 431/116 |
| 4,421,474 A | * | 12/1983 | Meyer | 431/115 |
| 5,125,582 A | | 6/1992 | Surjaatmadja et al. | |
| 5,253,733 A | | 10/1993 | Miyachi | |
| 5,388,985 A | * | 2/1995 | Musil et al. | 431/116 |

(Continued)

FOREIGN PATENT DOCUMENTS

| | | |
|---|---|---|
| DE | 20311631 U1 | 10/2003 |
| DE | 202007005930 U1 | 7/2007 |
| DE | 202007009472 U1 | 9/2007 |
| WO | WO2005022025 A1 | 3/2005 |

(Continued)

*Primary Examiner* — William E. Dondero
*Assistant Examiner* — Minh Truong
(74) *Attorney, Agent, or Firm* — Bryan Peckjian; SKF USA Inc. Patent Department

(57) ABSTRACT

Divider device for a flow of lubricant carried by a gas, typically air, comprising a distribution barrel (4) having an end face (5) into which run longitudinal distribution channels (6, 7) communicating with outlet orifices (8, 10) and a connection piece (18) mounted upstream of the distribution barrel (4) and comprising a hollow body with a bore (20) through which the flow of lubricant and gas can pass. The bore (20) of the connection piece (18) has a localized throttling region (26) of reduced cross section followed by a region (22) of enlarged cross section, and there is a gap defining a chamber (25) between the connection piece and the distribution barrel.

13 Claims, 4 Drawing Sheets

(56) References Cited

U.S. PATENT DOCUMENTS 5,921,349 A * 7/1999 Sato et al. .................... 184/6.14
6,257,370 B1    7/2001 Schwarze et al.
6,428,212 B1 * 8/2002 Tanaka ......................... 384/475

FOREIGN PATENT DOCUMENTS

| WO | WO2005113157 | A1 | 12/2005 |
| WO | WO2008132107 | A2 | 11/2008 |
| WO | WO2009003555 | A1 | 1/2009 |

* cited by examiner

DIVIDER DEVICE FOR FLOW OF LUBRICANT AND LUBRICATION SYSTEM

BACKGROUND OF THE INVENTION

This invention relates to lubrication by atomization of lubricant carried by a gas, typically compressed air.

The bearings of machine-tool shafts and spindles and rolling-contact bearings used in rolling mills and levelers for steelworks are generally lubricated by a centralized supply of lubricant delivering a flow of lubricant carried by a gas, typically compressed air. The mixture of air and lubricant is carried by pipes to the lubrication points where the lubricant must be delivered in the form of a mist of fine droplets of lubricant carried by the gas stream. The lubricant is carried along the pipes to the lubrication points in the form usually of a film of lubricant propelled by the air current. This mixture must therefore be modified to turn it into a mist consisting of a multitude of minute droplets of lubricant for each lubrication point.

The various lubrication points are therefore provided with divider devices designed to atomize the lubricant into minute droplets in the gas stream. German Utility Model Application 297 24492, which corresponds to U.S. Pat. No. 6,257,370 (REBS), describes the use of a connection piece which has an angular region in a supply bore followed by a tapering funnel-shaped region defining a dispensing chamber. Inside this chamber, lubricant droplets accumulate in dead regions from where they are picked up by the gas stream. A distribution barrel is coupled to the connection piece and comprises longitudinal channels which distribute the lubricant/air mixture.

A similar arrangement is found in German Utility Model Application 20 2007 005930 (REBS), which teaches the formation of turbulence in the supply stream by a funnel-shaped part located in a connection piece coupled to a distribution body.

In these devices, however, it is observed that the lubricating mixture is not correctly distributed when the backpressure downstream of the divider device is not the same in all the distribution channels.

The same fault is found in a divider device described in German Utility Model Application 20 2007 009472 (Lincoln), where the distribution between the different channels is effected by a conical piece which divides up the flow. International Patent Application WO 2005/113 157 (REBS) attempts to improve the distribution of lubricant/air mixtures by creating a swirling flow by having outlet orifices arranged radially. The aim is to create a helical swirl in a dispensing chamber located between a connection piece and a distribution barrel. The same type of construction is also found in German Utility Model Application DE 203 11631 (Delimon), which uses a swirl chamber and an expansion chamber between the supply and distribution of the lubricant/air mixture.

These devices do not perform satisfactorily in practice.

Additionally, all known devices are found to work defectively because of lubricant not being completely modified in the distribution channels following the divider devices. This lubricant builds up inside the device and interferes with the operation of the divider.

SUMMARY OF THE INVENTION

It is an object of the present invention to improve the divider devices of the prior art.

The present invention also relates to a divider device in which the atomization of the lubricant into minute droplets occurs regardless of the loss of head or the backpressure downstream of the device. The result is an equalized distribution of the lubricant at various lubrication points of a given system.

The invention also relates to a divider device that eliminates the faults of operation resulting from the lubricant build-up in the divider device.

In one embodiment, a divider device for a flow of lubricant carried by a gas, typically air, comprises a distribution barrel having an end face into which run longitudinal distribution channels communicating with outlet orifices and a connection piece mounted upstream of the distribution barrel and comprising a hollow body with a bore through which the flow of lubricant and gas can pass.

The bore of the connection piece has a localized throttling region of reduced cross section followed by a region of enlarged cross section. There is a gap defining a chamber between the connection piece and the distribution barrel.

The lubricant is thus atomized into fine droplets by the Venturi effect produced by the throttling region. The diameter of the lubricant droplets is around 1 to 100 microns. The existence of the chamber increases the turbulence of the flow of the mixture of lubricant droplets and gas. The minute atomized droplets then distribute themselves uniformly across the cross section of the chamber before striking the end face of the distribution barrel and passing into the longitudinal distribution channels. The distribution of the lubricant across all the distribution channels is excellent, even if head losses are not identical in each distribution channel.

The distribution barrel and the connection piece are advantageously inserted in an assembly tube whose bore defines said chamber.

That part of the barrel which comprises the outlet orifices may project from said assembly tube.

In a preferred embodiment, the divider device also comprises means for the recirculation of lubricant that has not entered the distribution barrel and is in the aforementioned chamber.

The reason for this is that some of the lubricant stays in the chamber without entering one of the distribution channels. The build-up of this lubricant in the chamber could spoil the operation of the divider device. By continuously recirculating this lubricant and reusing it, this difficulty is solved.

For this purpose, the connection piece comprises preferably at least one radial passage passing through its wall, communicating with said chamber, and opening into the localized throttling region or into the immediate vicinity of the latter.

The connection piece may comprise multiple evenly distributed radial passages passing through its wall, communicating with said chamber, and opening into the localized throttling region or into the immediate vicinity of the latter. Lubricant that stays in the chamber is thus sucked out by the depression caused by the Venturi effect of the throttling of the connection piece and is recycled into the stream of mixed lubricant and gas into the connection piece.

In one advantageous embodiment, the connection piece comprises an upstream tubular portion and a downstream tubular portion, these two being separated from each other by an annular rib whose outside diameter is greater than that of said tubular portions but less than that of the bore of the assembly tube, through which annular rib the aforementioned radial passage(s) pass.

The upstream tubular portion of the connection piece may be force-fitted into the assembly tube, the downstream tubular portion and the annular rib being housed in the chamber defined inside said assembly tube, and a radial play being left between the periphery of the annular rib and the bore of the assembly tube in said chamber.

In one embodiment, the distribution barrel has, on its end face, a projecting portion of generally conical shape pointing towards the connection piece.

The distribution barrel may advantageously comprise a first set of radial outlet orifices communicating with a first set of longitudinal distribution channels, and a second set of radial outlet orifices communicating with a second set of longitudinal distribution channels. The device can thus lubricate a particular point and allow the flow of lubricant and gas to be transferred to another lubrication point, optionally fitted with another divider device of the same structure.

In another aspect, the invention provides a lubrication system, particularly for chambers of multiple rolling-contact bearings in rolling mills or levelers, with multiple points of lubrication from a centralized supply providing a flow of lubricant carried by a gas, typically air. The system uses multiple divider devices as described above mounted in series in a supply passage, each divider device supplying one lubrication point and transferring to the next device the remaining flow of lubricant and gas.

BRIEF DESCRIPTION OF THE SEVERAL VIEWS OF THE DRAWINGS

The invention will be understood more clearly on studying an embodiment taken as an example, without any limitation being implied, illustrated in the appended drawings, in which.

DETAILED DESCRIPTION OF THE INVENTION

Figure 1:
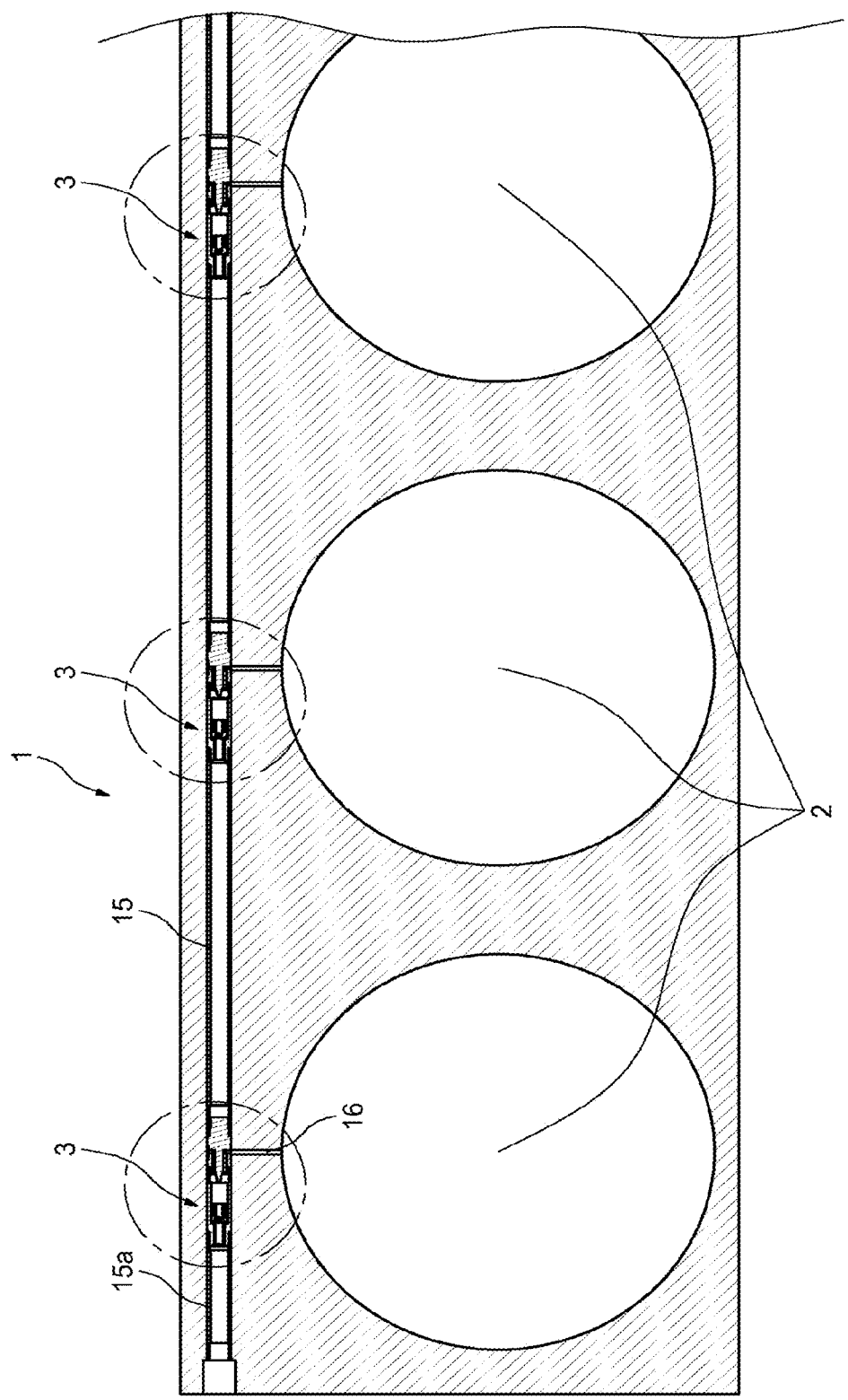
FIG. 1 is a cross section through a multi-bearing assembly for a steel rolling mill fitted with lubricating devices according to the invention.
Figure 2:
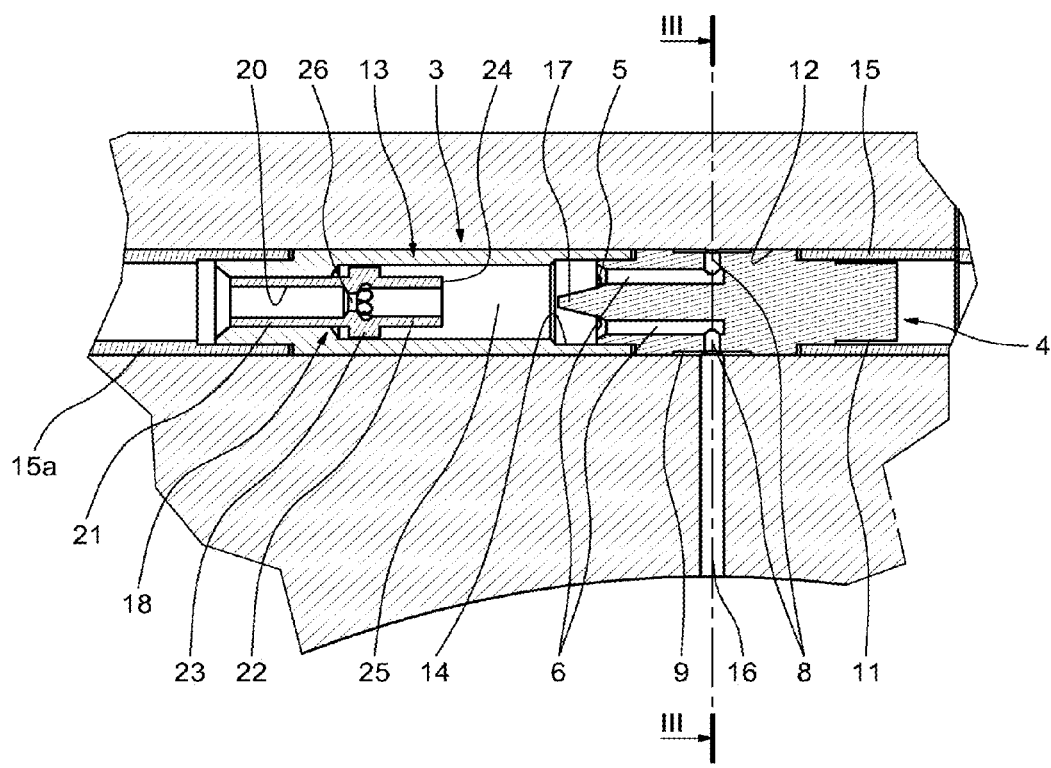
FIG. 2 is an enlarged cross section on a first longitudinal plane through a divider device according to the invention, as used in the system shown in FIG. 1.
Figure 3:
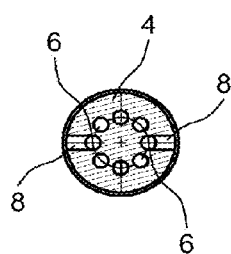
FIG. 3 is a transverse cross section on III-III as marked in FIG. 2.

As illustrated in FIG. 1, a multi-bearing assembly or "chock" as it is also known, marked 1 as a whole, supports a plurality of roller shafts mounted in the cylindrical recesses 2. For each rolling-contact bearing (not illustrated in the figure) a lubrication seal comprises a divider device 3. This kind of divider device, in one example of the invention illustrated in FIGS. 2 to 5, comprises a distribution barrel 4 with an end face 5 into which longitudinal distribution channels 6 and 7 extend. These are distributed evenly around a peripheral region of the end face 5. In the example depicted, two distribution channels 6, visible in FIGS. 2 and 3, are positioned on diametrically opposite sides and communicate with outlet orifices 8 formed by radial passages, also diametrically opposed, which pass out of the distribution barrel 4 in an annular region 9 of smaller diameter running all the way around the circumference of the barrel 4.

Figure 4:
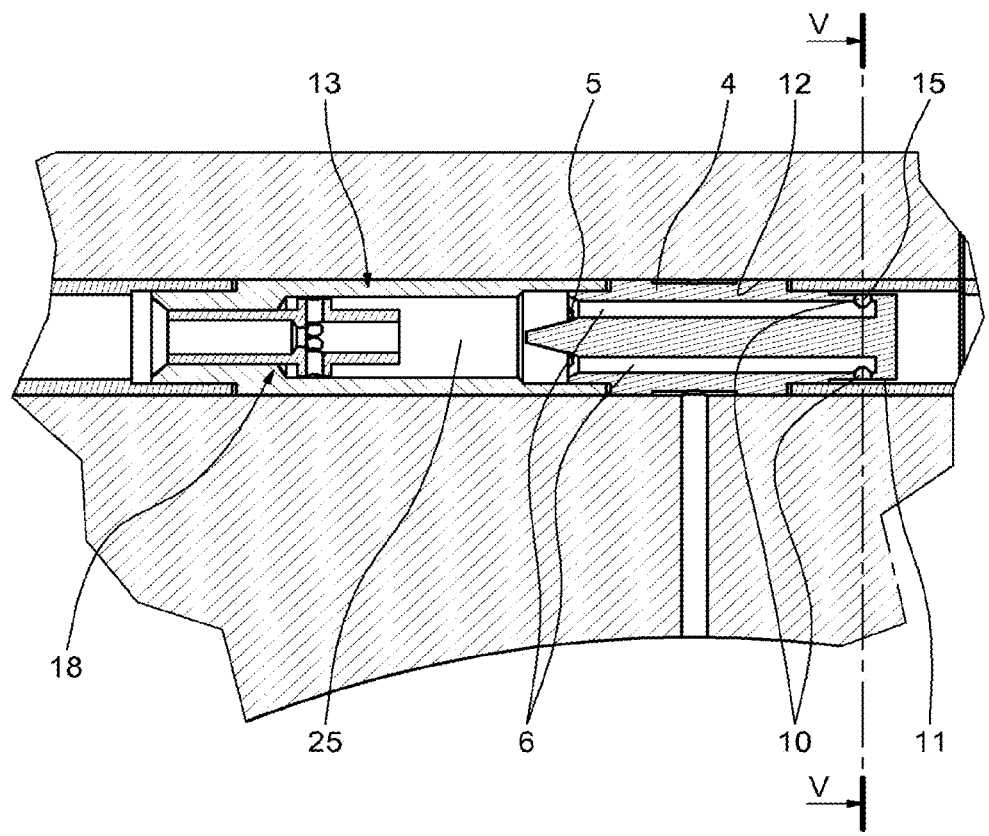
FIG. 4 is a cross section on another longitudinal plane through the same divider device.
Figure 5:
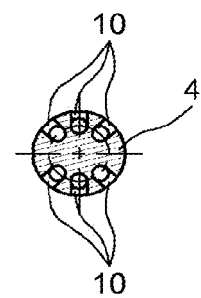
FIG. 5 is a transverse cross section on V-V as marked in FIG. 4.

Other longitudinal channels 7, of which there are 6 in the example illustrated, are distributed symmetrically on either side of the channels 6 and lead to outlet orifices 10 which take the form of radial passages leading to an annular smaller-diameter region 11 at the far end of the distribution barrel 4 from the end face 5. The distribution channels 7 extend longitudinally further than the longitudinal channels 6 and end in the vicinity of the end of the barrel 4, as can be seen in FIG. 4.

The distribution barrel 4 is fitted inside a through passage 12 formed in the actual thickness of the wall of the chock 1. The distribution barrel 4 includes a central portion containing the annular smaller-diameter region 9, but whose outside diameter away from the said annular region 9 corresponds to the bore of the passage 12. The end of the barrel 4 containing the end face 5 is inserted into the end of an assembly tube 13, which in turn is installed inside the passage 12 in the chock 1. That part of the barrel 4 which comprises the outlet orifices 8 and 10 projects from the assembly tube 13. The majority of the assembly tube 13 has an outside diameter equal to the inside diameter of the bore of the passage 12. Towards one of its ends, the assembly tube 13 has a portion where the bore 14 allows the end of the distribution barrel 4 to be inserted, by force so as to create a seal.

The opposite end of the distribution barrel 4 from the end face 5 is inserted into a connection tube 15 which defines a passage for the air/lubricant mixture from a first divider device 3 to the next divider device 3, as can be seen in FIG. 1 in particular. The connection tube 15 thus constitutes a spacer defining, inside the passage 12, a precise gap between two divider devices 3. The outside diameter of the end of the distribution barrel 4 intended to be inserted into the end of the connection tube 15 is equal to the diameter of the bore of the connection tube 15, to create a leaktight fit. The annular smaller-diameter region 11 at the end of the distribution barrel 4 thus defines a gap between the outer surface of this portion of the barrel 4 and the bore of the connection tube 15, and the orifices 10 communicate with this gap.

Similarly, the annular smaller-diameter region 9 defines a peripheral groove around the distribution barrel 4 with which the orifices 8 communicate and which is also in communication with a lubrication channel 16 connected to the recess 2 which corresponds to the divider device 3. The lubrication channel 16 is preferably oriented radially with respect to the circular-section recess 2 in order to minimize the length between the divider device 3 and the recess 2 acting as the bearing housing, which must be lubricated.

The end face 5 of the distribution barrel 4 can be seen to have a projecting portion of generally conical shape, marked 17, in the centre of the circle defining the end face 5, forming a spike leading in the opposite direction to the distribution channels 6 and 7.

Figure 6:
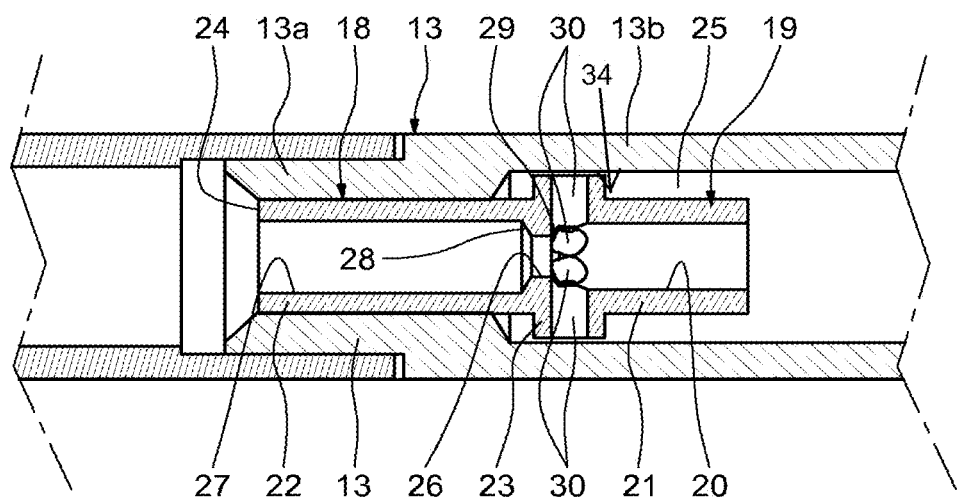
FIG. 6 is an enlarged cross section showing more particularly the connection piece of a divider device according to the invention.

A connection piece 18 is installed in the flow of the air/lubricant mixture, upstream of the distribution barrel 4 inside the assembly tube 13. The connection piece 18 has a hollow body with a bore 20 through which the lubricant/air flow from a central supply (not shown in the figures) can pass. The connection piece 18 comprises an upstream tubular portion 21 and a downstream tubular portion 22 (FIG. 6) separated from each other by an annular rib 23 whose outside diameter is greater than that of the tubular portions 21 and 22. The connection piece 18 is fitted via its upstream tubular portion 21 into a portion 13a of the assembly tube 13 which has a bore whose diameter corresponds to the outside diameter of the tubular portion 21, to create a seal. The downstream tubular portion 22, like the annular rib 23, projects from the assembly tube 13 into a portion 13b of the latter where the bore is greater than the outside diameter of the annular rib 23. In this way a gap is left between the cylindrical peripheral surface of the annular rib 23 and the bore of the portion 13b of the assembly tube 13, as FIG. 6 shows. The downstream tubular portion 22 ends at an end face 24 remote from the end face 5 of the distribution barrel 4 as FIGS. 2 and 4 show, in order to define a chamber 25 between the connection piece 18 and the distribution barrel 4.

The bore of the distribution piece 18 has a localised throttling region 26 (FIG. 6). This is inside the annular rib 23 and it connects to the bore 20 of the upstream tubular portion 21 via a tapering portion 28 whose angle is, in the example illustrated, about 120°. The throttling region 26 opens into the bore 27 of the downstream tubular portion 22 through a tapering portion 29 whose angle is, in the example illustrated, also about 120°.

Radial passages 30, of which there are six in the example illustrated, pass through the wall 34 and the connection piece 18 at the site of the annular rib 23. These evenly distributed radial passages 30 terminate in the tapering portion 29 in the immediate vicinity of the throttling region 26 downstream thereof, in the bore of the connection piece 18. On the outside, the radial passages 30 open into the gap between the cylindrical surface of the annular rib 23 and the bore 13b of the assembly tube 13. The radial passages thus communicate with the chamber 25.

As FIGS. 1 and 2 show, the assembly tube 13 is inserted, via its end containing the connection piece 18, into the bore of a connection tube 15a. It is a force fit to prevent leaks.

The divider device described above works in the following way: a mixture of compressed air at a pressure that may be between 2 and 8 bar, and lubricant, is delivered by the connection tube 15a situated furthest upstream, having arrived from a centralized supply (not shown in the figures). This mixture enters the first divider device 3 by flowing along the bore 20 of the upstream tubular portion 21 of the connection piece 18. The throttling region 26, in combination with the tapering portions 28 and 29, forms inside the bore of the connection piece 18 a Venturi which creates turbulence in the flow which atomizes the lubricant. A multitude of minute droplets is thus formed as the flow passes through the throttling region 26 and is carried into the chamber 25 before striking the end face 5. This atomizing action of the throttling region, and the even distribution of the resulting minute droplets of lubricant throughout the surface area of the end face 5, due to the path set up along the chamber 25, makes for an excellent distribution of lubricant in finely atomized form inside the distribution barrel 4. The mixture of lubricant atomized in this way within the air flow is distributed evenly regardless of any loss of head due to the length and path of the various lubrication passages downstream of the divider device 3. The existence of the throttling region 26 in combination with the chamber 25 thus brings about an excellent distribution of atomized lubricant regardless of head losses downstream. The existence of the projecting portion 17 is also advantageous as it encourages the distribution of the mixture of atomized lubricant and compressed air.

Some of the lubricant that strikes the end face 5 but does not enter one of the longitudinal channels 6 and 7 drips into the bottom of the chamber 25. This lubricant is preferably licked up and recirculated into the compressed air stream. The radial passages 30 running through the annular rib 23 of the connection piece 18 enable this lubricant to be recirculated. The reason for this is that these radial passages 30 which have open ends in the immediate vicinity of the throttling region 26 downstream or upstream thereof, or as a variant in this throttling region 26, are subjected to a Venturi effect which aspirates any lubricant in the chamber 25 through said channels 30, owing to the movement of the flow of compressed gas and lubricant along the bore of the connection piece 18. Lubricant in the chamber 25 is licked up by the radial passages 30 and re-injected into the compressed airstream, at the site of the throttling region 26 or immediately upstream or downstream of it. This lubricant is therefore atomized again before being returned to the chamber 25 where it can once again strike the end face 5.

Most of the mixture of atomized lubricant and compressed air, after striking the end face 5, passes into the longitudinal distribution channels 6 and 7. The mixture conveyed by the channels 6 passes out through the radial orifices 8 into the smaller-diameter region 9 and into the lubrication channel 16 of the recess 2 connected to the divider device 3. The rest of the mixture of lubricant and compressed air conveyed by the longitudinal channels 7 passes out through the radial orifices 10 situated downstream of the distribution barrel 4. The mixture of compressed air and lubricant is then taken up by the connection tube 15 and conveyed to the next divider device 3 connected to the next recess 2. In this second divider device 3, the same atomizing process takes place for the same reasons.

By using multiple divider devices 3 positioned in series along a given passage 12 of the chock 1, it will be seen that the result is a lubrication system with multiple lubrication points connected to a centralised supply. The present invention achieves excellent distribution of lubricant, even though the backpressure varies depending on the position of the various divider devices and the position of the outlet orifices of the various distribution channels inside each of the divider devices. It will be seen that the inside diameters of the distribution channels 6 and 7, and the structure of the orifices 8 and 10, are preferably practically identical in order to maintain an almost unvarying head loss.

Although the invention has been described chiefly in relation to its use in a rolling mill, it will be understood that it can also be used in other industrial fields such as papermaking, in order to correctly lubricate the rolling-contact bearings of papermaking machines.

The invention can also be used to lubricate the flanges of the wheels of railway vehicles or any other rotating member in a vehicle.

The invention claimed is:
1. A divider device for a flow of lubricant carried by a gas, the divider device comprising:
   a distribution barrel having an end face, a plurality of outlet orifices spaced from the end face, and longitudinal distribution channels extending from the end face and communicating with the outlet orifices, and
   a connection piece mounted upstream of the distribution barrel such that an axial gap is positioned between the connection piece and the distribution barrel, the location of the axial gap in the divider device forming a chamber located between and separating the distribution barrel and the connection piece such that the distribution barrel does not contact the connection piece, the connection piece including a hollow body with a bore through which passes the flow of lubricant and gas, the bore having a localized throttling region of reduced cross section and a region of enlarged cross section, wherein the chamber surrounds a downstream tubular portion of the region of enlarged cross section of the connection piece, the chamber also being positioned between the downstream tubular portion and an assembly tube within which the connection piece is positioned.
2. The divider device according to claim 1, further comprising an assembly tube having a bore, the distribution barrel and the connection piece being disposed within the assembly tube such that the assembly tube bore partially defines the chamber.

3. The divider device according to claim 2, wherein the outlet orifices are disposed in a part of the distribution barrel which projects from the assembly tube.

4. The divider device according to claim 2, further comprising means for the recirculation of lubricant disposed within the chamber and externally of the distribution barrel.

5. The divider device according to claim 4, wherein the connection piece includes a wall and at least one radial passage extending through the wall, communicating with the chamber, and opening into one of the localised throttling region and an immediate vicinity of the throttling region.

6. The divider device according to claim 5, wherein the connection piece has a plurality of the radial passages spaced circumferentially around the wall.

7. The divider device according to claim 4, wherein the connection piece includes an upstream tubular portion, a downstream tubular portion, and an annular rib separating the upstream and downstream tubular portions, the rib having an outside diameter greater than an outside diameter of each tubular portion and less than an inside diameter of the bore of the assembly tube, at least one radial passage extending through the rib.

8. The divider device according to claim 7, wherein the upstream tubular portion of the connection piece is force-fitted into the assembly tube, the downstream tubular portion and the annular rib being housed in the chamber defined inside the assembly tube such that radial clearance space is defined in the chamber between the outer periphery of the annular rib and the bore of the assembly tube.

9. The divider device according to claim 1, wherein the distribution barrel has a generally conical-shaped projecting portion extending from the end face and generally towards the connection piece.

10. The divider device according to claim 1, wherein the distribution barrel has a first set of the outlet orifices communicating with a first set of the longitudinal distribution channels and a second set of the outlet orifices communicating with a second set of the longitudinal distribution channels.

11. A lubrication system for lubricating chambers of multiple rolling-contact bearings in rolling mills or levelers, with multiple points of lubrication by providing a flow of lubricant carried by a gas, the system comprising:

a supply passage and a plurality of dividers disposed within the supply passage and each supplying lubricant to a separate one of the lubrication points, each divider including:

a distribution barrel having an end face, outlet orifices spaced from the end face, longitudinal distribution channels extending from the end face and communicating with the outlet orifices, and a connection piece mounted upstream of the distribution barrel such that an axial gap is positioned between the connection piece and the distribution barrel, the location of the axial gap in the divider device forming a chamber located between and separating the distribution barrel and the connection piece such that the distribution barrel does not contact the connection piece, the connection piece including a hollow body with a bore through which passes the flow of lubricant and gas, the bore having a localized throttling region of reduced cross section and a region of enlarged cross section, wherein the chamber surrounds a downstream tubular portion of the region of enlarged cross section of the connection piece, the chamber also being positioned between the downstream tubular portion and an assembly tube within which the connection piece is positioned.

12. The divider device according to claim 1, wherein the chamber has a greater diameter than the diameter of any portion of the localized throttling region of reduced cross section of the connection piece and larger than the diameter of any portion of the region of enlarged cross section of the connection piece.

13. The divider device according to claim 11, wherein the chamber has a greater diameter than the diameter of any portion of the localized throttling region of reduced cross section of the connection piece and larger than the diameter of any portion of the region of enlarged cross section of the connection piece.

* * * * *